(12) United States Patent
Norton et al.

(10) Patent No.: US 6,568,754 B1
(45) Date of Patent: May 27, 2003

(54) EXPANDABLE, REDEPLOYABLE AUTOMOTIVE HEADREST

(75) Inventors: Russell Lee Norton, Dearborn Heights, MI (US); John Wayne Jaranson, Dearborn, MI (US); Manoharprasad K. Rao, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 101 days.

(21) Appl. No.: 09/698,534

(22) Filed: Oct. 30, 2000

(51) Int. Cl.[7] .................................................. B60N 2/42
(52) U.S. Cl. .................................................. 297/216.12
(58) Field of Search ........................... 297/391, DIG. 3, 297/216.1, 216.12; 280/730.1

(56) References Cited

U.S. PATENT DOCUMENTS

| 3,869,145 | A |   | 3/1975 | Takada |
|---|---|---|---|---|
| 3,927,901 | A |   | 12/1975 | Weman |
| 5,490,691 | A |   | 2/1996 | Sinnhuber et al. |
| 5,694,320 | A |   | 12/1997 | Breed |
| 5,833,312 | A | * | 11/1998 | Lenz |
| 5,975,637 | A |   | 11/1999 | Geuss et al. |
| 6,088,640 | A |   | 7/2000 | Breed |
| 6,149,231 | A | * | 11/2000 | Wustholz |
| 6,158,812 | A | * | 12/2000 | Bonke |
| 6,199,900 | B1 | * | 3/2001 | Zeigler |
| 6,331,014 | B1 | * | 12/2001 | Breed |

FOREIGN PATENT DOCUMENTS

| EP | 1046550 A2 | 4/1999 |
|---|---|---|
| JP | 7137592 A | 11/1993 |
| JP | 11034711 A | 5/1997 |
| JP | 2000006751 A | 6/1998 |

* cited by examiner

*Primary Examiner*—Milton Nelson, Jr.
(74) *Attorney, Agent, or Firm*—Gary A. Smith

(57) ABSTRACT

An active, resettable head restraint system includes a collision prediction system for detecting objects approaching the vehicle from the rear, a pressure tank containing a quantity of pressurized air, a motor-driven compressor for maintaining a desired pressure in the tank, and an expandable headrest. The headrest comprises a base mounted to the seat back in conventionally known fashion, a pad connected to the base for movement between a rearward pre-deployment position and a forward deployed position, and at least one inflatable bladder located between the base and the pad. The bladder is connected with the pressure tank for inflation when activated by the collision prediction system. When in the deflated condition, the bladder is substantially contained within the base, and the headrest has a relatively narrow pre-deployment configuration. When the bladder is inflated it expands to urge the pad forward, and simultaneously expands laterally outward beyond the pre-deployment perimeter of the base to enlarge the overall width of the headrest. The headrest is relatively narrow when in the pre-deployment condition in order to minimize obstruction of the driver's rearward vision and rear seat passengers, forward vision. When inflated, the headrest expands to a relatively wide configuration to provide improved head restraint during an accident.

17 Claims, 3 Drawing Sheets

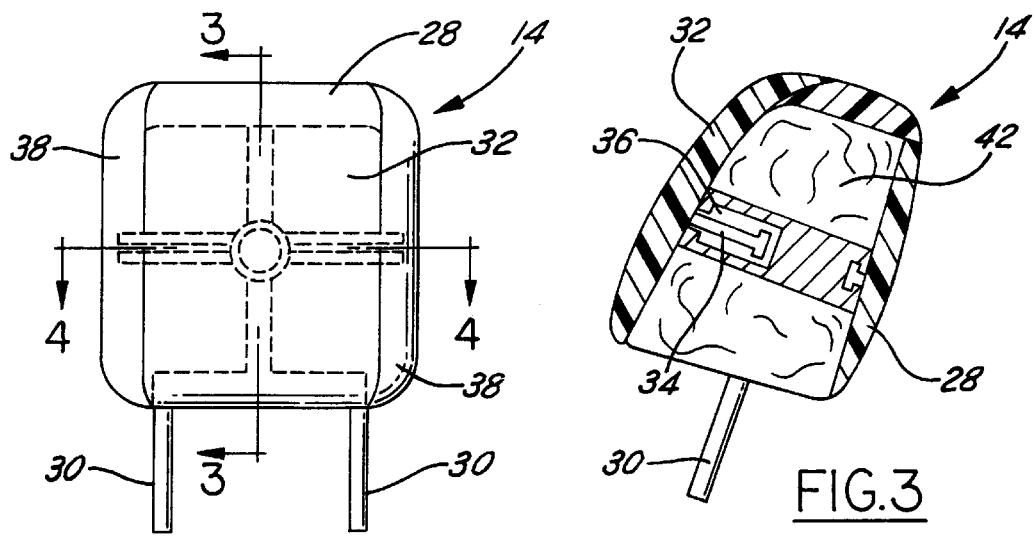
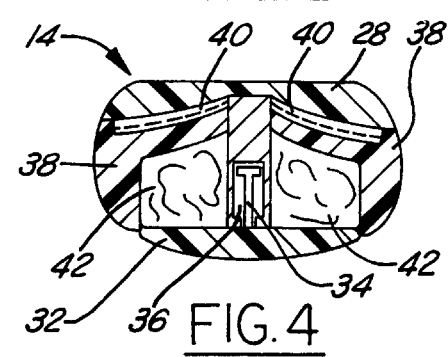
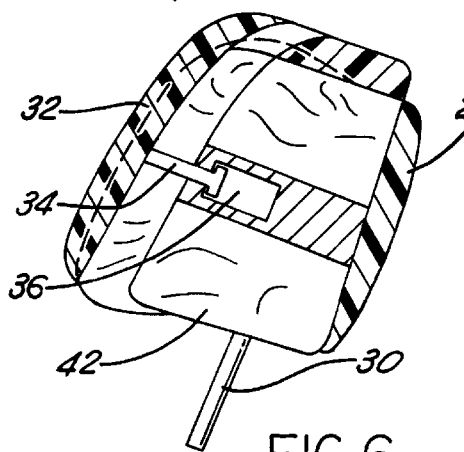
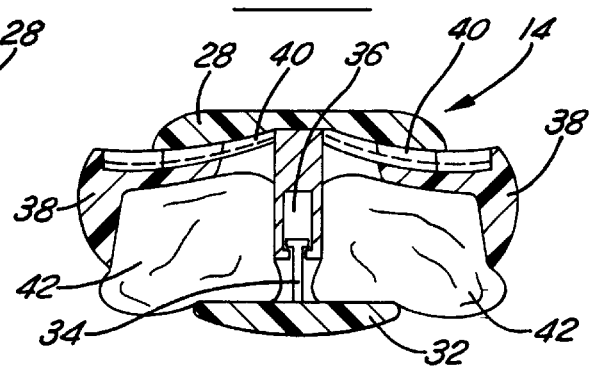

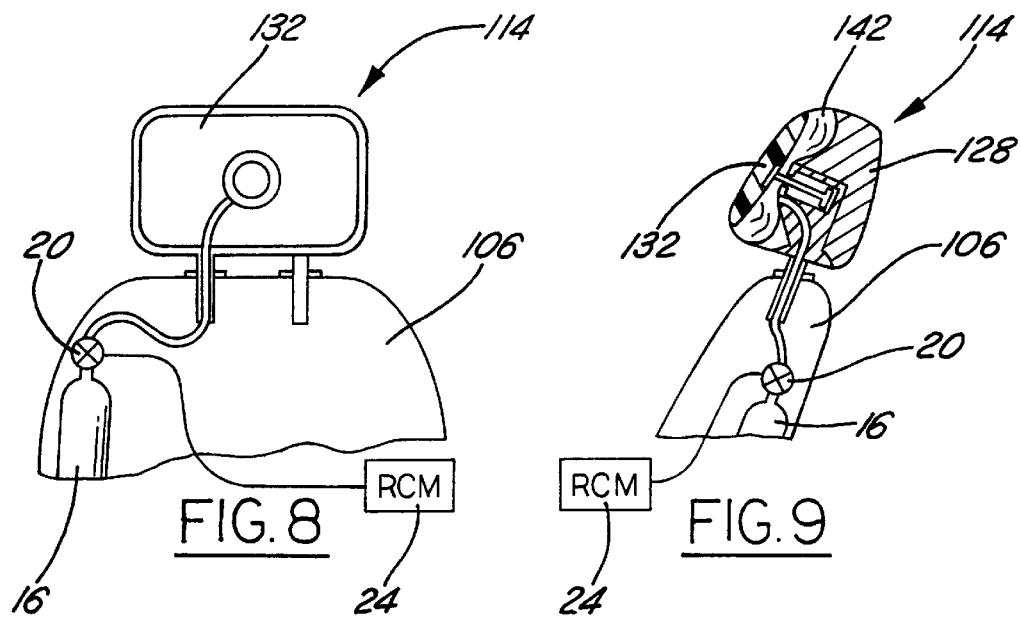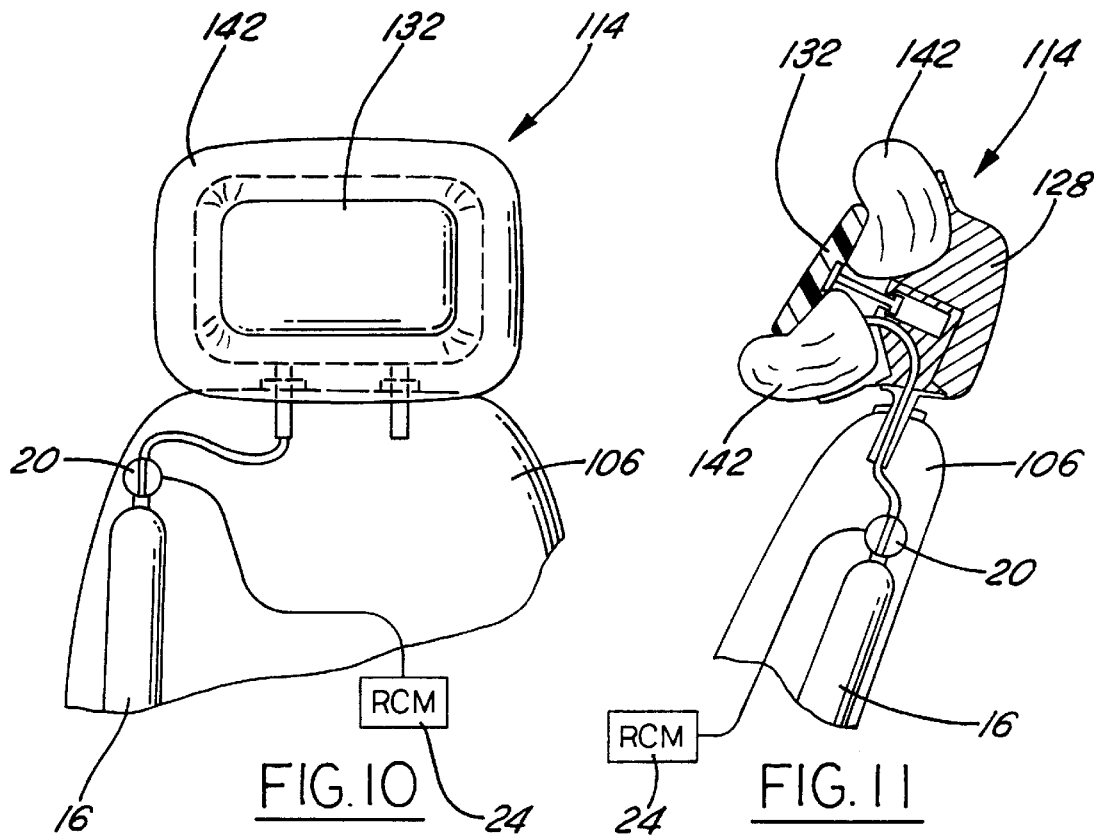

US 6,568,754 B1

EXPANDABLE, REDEPLOYABLE AUTOMOTIVE HEADREST

FIELD OF THE INVENTION

The present invention relates to headrests used in automobiles to prevent whiplash-type injuries, and more specifically to such a headrest that expands to offer better protection against such injuries.

BACKGROUND OF THE INVENTION

Whiplash-type neck injuries are a common form of automotive vehicle injury, typically occurring when the vehicle is struck from the rear. A large number of whiplash injuries could be prevented or reduced in severity if the headrest were positioned closer to the head of the occupant at the time of the impact. Many vehicle occupants, however, fail to properly adjust the headrest so that the distance between the back of their head and the headrest is kept to a minimum.

Many systems have been proposed for moving the headrest forward toward the seat occupant's head in reaction to a sensed or predicted rear impact. Such systems are referred to herein as active head restraint systems. Some known active systems utilize a pyrotechnically inflated airbag that expands forwardly out of the headrest or upwardly out of seatback between the headrest and the seat occupant's head. (See, for example, U.S. Pat. Nos. 3,779,577 and 5,738,407.) Such pyrotechnically inflated systems have the drawback that once the airbag has deployed, resetting or repacking it is a complicated and expensive procedure that can only be performed by skilled automotive technicians. As a result, such pyrotechnic airbags can only practically be deployed by a crash sensor that detects vehicle accelerations caused by an impact. While many crash prediction systems utilizing a broad range of sensors (radar, lidar, ultrasonic, transponders, etc.) have been proposed, none of these systems are considered reliable enough at the present time to utilize them as a trigger for airbags, since the false-alarm rate may be significant and the consequences of a false alarm may be expensive.

The term "resettable" as used herein with regard to a deployable headrest refers to the quality whereby there is little or no permanent damage to the system when it deploys during an impact. After the event, it can be returned to the pre-deployment condition and be ready for another deployment without expensive repair. A resettable headrest may allow the use of a crash prediction system before the system has achieved a high degree of reliability. If a resettable headrest is deployed in response to a false alarm, the consequences will be mild, since the headrest can be returned to its pre-deployment condition quickly, simply and inexpensively.

Mechanically deployed headrests have been proposed which, by their nature, may be relatively inexpensive and simple to reset to a non-deployed or retracted condition after use. An example of a mechanically deployed headrest is disclosed in U.S. Pat. No. 5,694,320. As compared with inflatable systems, mechanical systems may be more difficult to control so that they are deployed in a safe manner, since they involve moving a solid object of relatively large mass toward the rear of the occupant's head. If the headrest is still moving forward when it impacts the rearwardly moving head of the occupant, the kinetic energy of the impact will be increased, and so will the potential for injury.

Another safety concern with headrest design is the tradeoff between the improved safety yielded by a larger, wide and taller headrest, and the decreased rearward visibility that such a larger headrest may cause. In general, a wider headrest would be advantageous during an accident since it will be more likely to effectively restrain the head of an occupant against whiplash injuries. If the headrest is narrow, the occupant's head may glance off the side of a headrest if the seat occupant is not sitting in a centered position in the seat but is leaning to the left or right, or if the vehicle is involved in a rear angular impact.

SUMMARY OF THE INVENTION

The present invention provides an active head restraint system that overcomes the above-described limitations of both pyrotechnically inflatable and mechanical actuated headrests. In the disclosed embodiments of the invention, the head restraint system includes a collision prediction system for detecting objects approaching the vehicle from the rear, a pressure tank containing a quantity of pressurized air, a motor-driven compressor for maintaining a desired pressure in the tank, and an expandable headrest. The headrest comprises a base mounted to the seat back in conventionally known fashion, a pad connected to the base for movement between a rearward pre-deployment position and a forward deployed position, and at least one inflatable bladder located between the base and the pad. The bladder is connected with the pressure tank for inflation when activated by the collision prediction system.

When in the deflated condition, the bladder is substantially contained within the base, and the headrest has a relatively narrow pre-deployment configuration. When the bladder is inflated it expands to urge the pad forward, and simultaneously expands laterally outward beyond the pre-deployment perimeter of the base to enlarge the overall width of the headrest. The invention system thus provides a headrest that is relatively narrow when in the pre-deployment condition in order to minimize obstruction of the driver's rearward vision and rear seat passengers, forward vision. When inflated, the headrest expands to a relatively wide configuration to provide improved head restraint during an accident.

The invention has the further benefit of being easily resettable due to the pneumatic inflation of the bladder. The motor driven air compressor used to pressurize the pressure tank is also usable for a multitude of other functions on the vehicle, such as a pneumatic suspension system.

In a first embodiment of the invention includes first and second laterally moveable wings which are slidingly mounted to the base and are urged outwardly in opposite directions by inflation of first and second bladders, thereby widening the headrest to decrease the likelihood that the occupant's head will glance or roll off to the side the headrest after contact. The wings also provide a slightly concave front surface of the headrest that further help to prevent the occupant's head from glancing or rolling to the side.

According to a second embodiment of the invention, a bladder is positioned to form a collar substantially surrounding the pad when in the inflated condition, thereby increasing both the width and height of the headrest and so providing better had restraint for seat occupants having different seated heights. The collar also provides a slightly concave front surface of the headrest that tends to prevent the seat occupants head from glancing or rolling to the side during a crash event.

DESCRIPTION OF THE DRAWINGS

FIG. 2 is a front view of a headrest of the system shown in FIG. 1;

FIG. 3 is a side view of the invention headrest;

FIG. 4 is a cross-sectional view taken along the lines 4—4 of FIG. 2;

FIG. 5 is a front view of the headrest in a deployed condition;

FIG. 6 is a cross-sectional view taken along line 6—6 of FIG. 5;

FIG. 7 is a cross-sectional view taken along line 7—7 of FIG. 5;

FIG. 8 is a partial front view of a second embodiment of the invention in a pre-deployment condition;

FIG. 9 is a side view of the headrest of FIG. 8;

FIG. 10 is a front view of the headrest of FIGS. 8 and 9 in a deployed condition; and FIG. 11 is a side view of the headrest in the deployed condition.

DETAILED DESCRIPTION OF THE PREFERRED EMBODIMENTS

Figure 1:
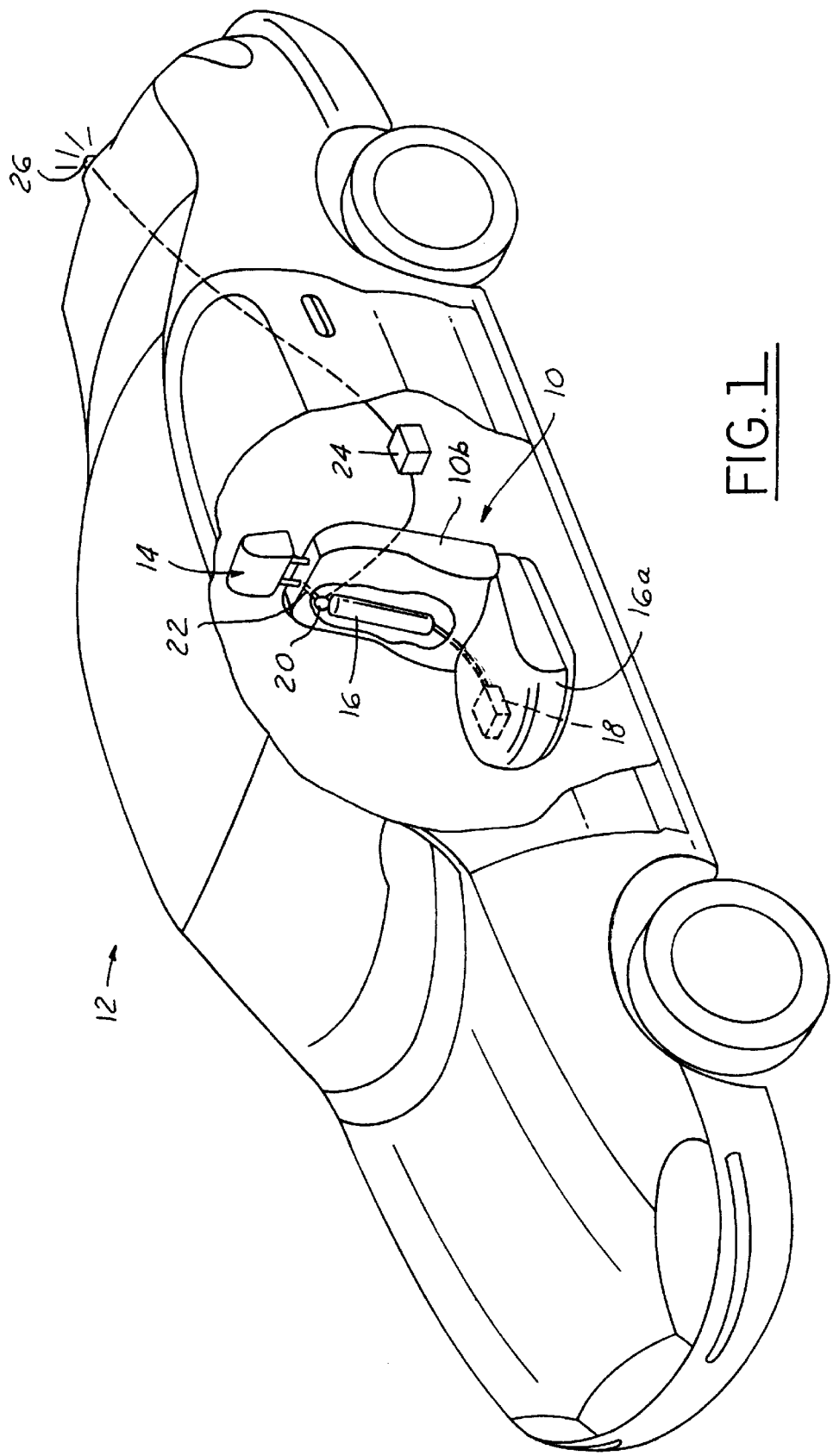
FIG. 1 is a perspective view of an active headrest system according to the present invention installed in an automobile.

Referring to FIG. 1, a seat 10 is shown installed in a motor vehicle 12 and generally includes a lower seat cushion 10a, a seat back 10b, and a headrest 14. The seat lower cushion 10a and seat back 10b are generally conventional in construction, except that the seat back contains a pressure tank 16 for holding compressed air. The pressure tank 16 is connected to an air compressor 18 located onboard the vehicle 12. The air compressor 18 may be located anywhere within the vehicle 12 and may be powered by any suitable power source, such as the vehicle electrical system or the vehicle's engine (not shown). The compressor 18 is operative to maintain the pressure tank 16 at a predetermined pressure, and may also be used to supply air pressure to any number of other vehicle systems which are beyond the scope of this invention. One example of a system that may be supplied with pressure by the compressor 18 is a pneumatic suspension system. A valve 20 regulates the discharge of air from the pressure tank 16 through an outlet tube 22 that extends upwardly into the headrest 14.

Opening and closing of the valve 20 is controlled by a restraints control module (RCM) 24 indicated schematically. The RCM 24 may be dedicated solely to operation of the active headrest of the present invention, but it preferably controls other components of a vehicle restraint system, such as front and side airbags, seatbelt retractors or pretensioners (not shown). As is well known in the automotive restraints field, RCM 24 receives inputs from a number of vehicle, systems and executes algorithms to control the restraint systems in a manner to achieve maximum safety in various impact situations. The RCM 24 may receive inputs from systems such as a crash accelerometer, an occupant weight/position sensor, and/or a vehicle tilt sensor (not shown). A contact sensor or a proximity sensor (not shown) for detecting the seat occupant's head may be integrated into the headrest 14 in a manner similar to that disclosed in U.S. Pat. No. 6,088,640, the disclosure of which is incorporated herein by reference.

According to the invention, the RCM 24 also receives signals from a collision-warning sensor 26, which may operate by any of the principles used for non-contact sensing, such as radar, laser radar, infrared, ultrasonic, optical, or transponder. The collision-warning sensor 26 is able to detect approaching objects and provide relative range and velocity information to the RCM 24. The RCM 24 uses these inputs in a collision prediction algorithm. The collision-warning sensor 26 is preferably directed toward the rear of the vehicle 12 to allow prediction of impacts with the rear of the vehicle 12, since it is rear collisions that are most likely to produce a whiplash-type injury to vehicle occupants.

Referring now to FIGS. 2–7, the headrest 14 comprises a base 28 attached to the seat back 10b by conventionally known means, such as two posts 30 that are slidingly received by holes in the top of the seat back 10b to permit vertical adjustment of the headrest 14. The tube 22 may extend through the interior of one of the posts 30, or it may connect with the headrest 14 separately from the posts. A generally rectangular pad 32 forms a substantial portion of the forward-facing surface of the headrest 14. A stem 34 extends rearwardly from the pad 32 and engages a cylindrical chamber 36 in the base 28 to permit sliding forward and rearward movement of the pad 32 relative to the base 28.

Left and right wings 38, are slidingly engaged with tracks 40 formed on the base 28 so that the wings are moveable laterally outward with respect to the base in opposite directions. The wings 38 are movable between retracted positions shown in FIGS. 2 and 4, and deployed positions shown in FIGS. 5 and 7. First and second bladders 42 are retained within the headrest 14 and are connected with the tube 22 so that they may be inflated by air from the pressure tank 16 when the valve 20 is opened. The bladders 42 are contained within the headrest 14 so that when in a deflated state they are disposed immediately behind the pad 32 and inboard of their respective wings 38, as best seen in FIG. 4. When the bladders 42 are in the deflated state, the base 28, pad 32, and wings 38 fit together to give the headrest 14 a smooth, unitary, and relatively narrow appearance.

When the collision warning sensor 26 detects an object having a range and/or velocity relative to vehicle 10 which is interpreted by the RCM 24 as indicating an impending rear collision, the RCM 24 sends a signal to the valve 20 instructing it to open and release compressed air from the pressure tank 16 through the tube 22 and into the first and second bladders 42. The bladders 42 inflate rapidly, urging the wings 38 laterally outward along their respective tracks 40 to their deployed positions, and simultaneously urging the pad 32 forwardly. When the wings 38 are deployed, the bladders 42 fill the space between the wings 38 and extend laterally outward beyond the pre-deployment perimeter of the headrest 14. See FIG. 5. The positioning of the wings 38 behind and outboard of the inflated bladders 42 increases the firmness of the headrest 14 and decreases the tendency of an occupant's head to roll off the headrest 14 to one side or the other when the head is urged backwardly against the headrest.

The pressure and quantity of air released from the pressure tank 16 by the valve 20 is metered to inflate the bladders 42 quickly and forcefully, yet to leave the bladders 42 undamaged by the inflation. After the event that triggered activation of the headrest 14 has passed, the bladders 42 are deflated either automatically or manually, and the headrest 14 may then be reset relatively easily and quickly by the owner/operator of the vehicle 12. This is accomplished by pushing the bladders 42 back to their original positions behind the pad 32 and inboard of the wings 38, and sliding the pad 32 and wings 38 back to their retracted positions. Mechanical detent means (not shown) are preferably provided so that the pad 32 and wings 38 snap back into the retracted positions. The headrest 14 is then ready for another actuation when needed.

The pad 32 is preferably made of a relatively lightweight material and constructed in a manner to have minimum mass so that deployment of the headrest 14 results in a minimum amount of kinetic energy being directed forwardly toward the occupant's head. The lightweight construction of the pad 32 also results in the headrest 14 deploying more quickly.

As previously mentioned, a contact or proximity sensor may also be provided to detect the occupant's head. Output from such a sensor may be fed to the RCM 24 so that the RCM can control the timing and/or degree inflation of the bladders 42 to prevent an overly forceful contact between the pad 32 and the occupant's head.

Instead of pressurizing pressure tank 16 with a compressor on board the vehicle, it is possible to simply charge the tank to a level that will allow several inflations of the bladder, after which the tank must be recharged by an off-board source of air pressure.

FIGS. 8–11 depict a second embodiment of a headrest 114 used in an active head restraint system according to the invention having a pressure tank 16, a electrically actuated valve 20, and an RCM 24 substantially identical to those components as described above in connection with the first embodiment. In the second embodiment of the invention, the headrest 114 comprises a base 128 (see FIGS. 9 and 11) that is vertically adjustable relative to the seat back 10b, a pad 132 connected to the base 128 for forward and rearward movement relative to the base 128, and a bladder 142 connected to the valve 20 to receive air from the pressure tank 16.

The bladder 142 is generally annular and substantially surrounds the pad 132. When in the deflated condition, the bladder 142 fits into the base 128 so that it is contained substantially completely within the perimeter of the base 128, and the pad 132 is slid rearwardly so that the headrest 114 has a smooth, unitary appearance. As in the previous embodiment of the invention, the pad 132 is preferably constructed to be as lightweight as possible so as to enable fast deployment with a minimum amount of kinetic energy.

When the valve 20 is opened by the signal from the RCM 24, air is released from the pressure tank 16 and flows into the bladder 142. The bladder 142 expands to urge the pad 132 forward with respect to the base 128, and also expands outwardly to increase the dimensions of the headrest 114 both laterally and vertically beyond that of the pre-inflation perimeter of the headrest 114. The deployed headrest 114 is thus more likely to effectively restrain the head of a seat occupant if the head is not centered with respect to the headrest 114.

Various other modifications and variations will no doubt occur to those skilled in the arts to which this invention pertains. Such variations and modifications, which generally rely on the teachings through which this disclosure has advanced the art, are properly considered within the scope of this invention. This disclosure should thus be considered illustrative, not limiting; the scope of the invention is instead defined by the following claims.

What is claimed is:

1. A headrest for mounting to a seat of an automotive vehicle having a collision prediction system, the headrest comprising:
    a base mountable to the seat and having a perimeter;
    a pad connected to the base for movement along an axis between a rearward position relative to the base and a forward position relative to the base;
    a wing mounted to the base for movement between a retracted position wherein it is relatively inboard with respect to a center of the headrest and a deployed condition wherein it is relatively outboard with respect to the center of the headrest; and
    at least one inflatable bladder disposed between the base and the pad and connectable with a source of pressurized gas for inflation thereby upon activation by the collision prediction system, the bladder having a deflated condition wherein the bladder is substantially contained within the base and an inflated condition wherein the bladder expands to urge the pad toward the forward position/and urge the wing to the deployed condition, thereby enlarging the headrest in a plane generally normal to the axis of pad movement.

2. The headrest according to claim 1 wherein the bladder in the inflated condition extends upwardly beyond the perimeter of the base to increase a vertical dimension of the headrest.

3. The headrest according to claim 1 further comprising a second wing, the first and second wings movable in generally opposite, lateral directions by inflation of the at least one bladder, thereby increasing a lateral dimension of the headrest.

4. The headrest according to claim 3 wherein the at least one bladder comprises a first bladder located to urge the first wing outwardly when inflated and a second bladder located to urge the second wing outwardly when inflated.

5. The headrest according to claim 1 wherein the bladder is positioned to form a collar substantially surrounding the pad when in the inflated condition, thereby increasing a lateral dimension and a vertical dimension of the headrest.

6. The headrest according to claim 5 wherein the bladder is generally toroidal in shape.

7. An active head restraint system for an automotive vehicle having a seat, the system comprising:
    a collision prediction system;
    a reservoir containing a quantity of pressurized air; and
    a headrest comprising:
        a base mountable to the seat and having a perimeter;
        a pad connected to the base for movement along an axis between a rearward position relative to the base and a forward position relative to the base;
        at least one wing mounted to the base for movement between a retracted position wherein it is relatively inboard with respect to a center of the headrest and a deployed condition wherein it is relatively outboard with respect to the center of the headrest; and
        at least one inflatable bladder disposed between the base and the pad and connected with the reservoir for inflation thereby upon activation by the collision prediction system, the bladder having a deflated condition wherein the bladder is substantially contained within the base and an inflated condition wherein the bladder expands to urge the pad toward the forward position and urge the at least one wing to the deployed condition, thereby enlarging the headrest in a plane generally normal to the axis.

8. The active head restraint system according to claim 7 wherein the at least one wing comprises first and second wings movable in generally opposite, lateral directions by inflation of the at least one bladder, thereby increasing a lateral dimension of the headrest.

9. The active head restraint system according to claim 8 wherein the at least one bladder comprises a first bladder located to urge the first wing outwardly when inflated and a second bladder located to urge the second wing outwardly when inflated.

10. An active head restraint system for an automotive vehicle having a seat, the system comprising:
    a collision prediction system;
    a reservoir adapted to be mounted in the seat, the reservoir containing a quantity of pressurized air; and a headrest comprising:
- a base mountable to the seat and having a perimeter;
- a pad connected to the base for movement along an axis between a rearward position relative to the base and a forward position relative to the base;
- at least one inflatable bladder disposed between the base and the pad and connected with the reservoir for inflation thereby upon activation by the collision prediction system, the bladder having a deflated condition wherein the bladder is substantially contained within the base and an inflated condition wherein the bladder expands to urge the pad toward the forward position and the bladder extends laterally outward beyond the perimeter of the base, thereby enlarging the headrest in a plane generally normal to the axis.

11. The active head restraint system according to claim 10 wherein the bladder is positioned to form a collar substantially surrounding the pad when in the inflated condition, thereby increasing a lateral dimension and a vertical dimension of the headrest.

12. The active head restraint system according to claim 11 wherein the bladder is generally toroidal in shape.

13. The active head restraint system according to claim 10 wherein the collision prediction system comprises a sensor mountable on the vehicle to detect objects approaching the vehicle from the rear.

14. The active head restraint system according to claim 10 further comprising means for pressurizing the reservoir.

15. The active head restraint system according to claim 14 wherein the means for pressurizing the reservoir comprises an air compressor.

16. The active head restraint system according to claim 15 wherein the air compressor is powered by an engine of the vehicle.

17. The active head restraint system according to claim 10 wherein the bladder in the inflated condition extends upwardly beyond the perimeter of the base to increase a vertical dimension of the headrest.

* * * * *